United States Patent
Noecker

(10) Patent No.: US 6,805,216 B2
(45) Date of Patent: Oct. 19, 2004

(54) METHOD FOR REGULATING THE DISTANCE BETWEEN A VEHICLE AND ANOTHER VEHICLE TRAVELING AHEAD AND A DISTANCE-REGULATING SYSTEM

(75) Inventor: Gerhard Noecker, Goeppingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/324,086

(22) Filed: Dec. 20, 2002

(65) Prior Publication Data

US 2003/0173127 A1 Sep. 18, 2003

Related U.S. Application Data

(63) Continuation of application No. PCT/EP01/06183, filed on May 31, 2001.

(30) Foreign Application Priority Data

Jun. 20, 2000 (DE) .......................................... 100 30 258

(51) Int. Cl.$^7$ ............................................... B60K 31/00
(52) U.S. Cl. .......................................... 180/170; 701/96
(58) Field of Search ................................ 180/170, 171; 701/93, 96, 116, 117, 119

(56) References Cited

U.S. PATENT DOCUMENTS

| | | | | | |
|---|---|---|---|---|---|
| 5,629,851 | A | * | 5/1997 | Williams et al. ............... | 701/96 |
| 5,761,629 | A | * | 6/1998 | Gilling .......................... | 701/96 |
| 5,771,007 | A | * | 6/1998 | Arai et al. .................... | 340/903 |
| 5,959,569 | A | * | 9/1999 | Khodabhai ................... | 342/70 |
| 5,999,874 | A | * | 12/1999 | Winner et al. ................ | 701/93 |
| 6,230,093 | B1 | * | 5/2001 | Michi et al. ................... | 701/96 |
| 6,301,542 | B1 | * | 10/2001 | Kirchberger et al. ......... | 701/93 |
| 6,304,811 | B1 | * | 10/2001 | Prestl ........................... | 701/96 |
| 6,311,119 | B2 | * | 10/2001 | Sawamoto et al. ........... | 701/96 |
| 6,311,123 | B1 | * | 10/2001 | Nakamura et al. ............ | 701/96 |
| 6,363,311 | B1 | * | 3/2002 | Kuroda et al. ................ | 701/96 |
| 6,427,111 | B1 | * | 7/2002 | Dieckmann .................. | 701/96 |

FOREIGN PATENT DOCUMENTS

| | | |
|---|---|---|
| DE | 42 09 047 C1 | 3/1992 |
| DE | 196 38 511 A1 | 9/1996 |
| EP | 0 605 104 A1 | 11/1993 |
| EP | 0 716 949 A1 | 6/1996 |
| EP | 0 890 470 A2 | 1/1999 |
| JP | 09315180 | 12/1997 |
| WO | WO 00/36435 | 6/2000 |

OTHER PUBLICATIONS

German Search Report and translation of relevant portions.
International Search Report.

* cited by examiner

Primary Examiner—Brian L. Johnson
Assistant Examiner—Brian Swenson
(74) Attorney, Agent, or Firm—Crowell & Moring LLP

(57) ABSTRACT

In a method for regulating the distance between a vehicle and another vehicle traveling ahead, vehicle state variables, vehicle characteristic variables are determined together with the distance from and velocity of at least one other vehicle in the vicinity. The distance from the other vehicle and the vehicle's own velocity are set to permitted limiting values. To increase driving safety, the vehicle's own velocity or the setpoint distance from the other vehicle traveling directly ahead are determined as a function of the vehicle velocity of at least one other vehicle traveling to the side, or of the distance between a plurality of other vehicles traveling to the side.

18 Claims, 3 Drawing Sheets

METHOD FOR REGULATING THE DISTANCE BETWEEN A VEHICLE AND ANOTHER VEHICLE TRAVELING AHEAD AND A DISTANCE-REGULATING SYSTEM

CROSS REFERENCE TO RELATED APPLICATIONS

This application is a continuation of International Patent Application No. PCT/EP01/06183 filed May 31, 2001 the disclosure of which is expressly incorporated by reference herein. Convention priority is claimed based on German patent document 100 30 258.0, filed Jun. 20, 2000.

BACKGROUND AND SUMMARY OF THE INVENTION

The invention relates to a method and apparatus for regulating the distance between one vehicle and another.

In distance-regulating systems of the generic type, a target velocity which is to be maintained by the vehicle and which must not be exceeded by the vehicle traveling behind can be determined automatically as a function of the absolute velocity of the vehicle and the distance from a vehicle traveling directly ahead. On the basis of the calculated target velocity, and if appropriate other current vehicle state variables, the system generates actuation signals, which are used to set the engine, the gearbox and/or the braking device of the vehicle in order to maintain the target velocity. In order to determine the target velocity, the distance between the vehicle and the vehicle traveling ahead is acquired using a measuring device in the vehicle. Such a distance-regulating system has been described, for example, in German patent document DE 42 09 047 C1.

The relative distance or the relative velocity with respect to the vehicle traveling directly ahead is usually the basis for the setting of the velocity. However, in particular when traveling on multi-lane roads it is necessary to allow for the fact that when the distance-regulating system is activated, different velocities of lines of traffic in the various lanes may result in a vehicle velocity which is higher than the velocity of the line of traffic in the adjacent lane, so that the driver has to reduce the vehicle velocity manually in order to prevent unintentional overtaking in the right-hand lane.

A further problem may occur when there is a lane change if, after the lane change has been completed, the distance from the vehicle which is now traveling directly ahead in the new lane is greater than the distance from the vehicle which was traveling ahead in the previous lane. The permitted vehicle velocity can, under certain circumstances, be increased automatically by the distance-regulating system, which may also result in the risk of overtaking in the right-hand lane.

European patent document EP 01 716 949 A1 discloses a method and apparatus for regulating the distance between a vehicle and a vehicle traveling ahead, which also takes into account vehicles traveling in adjacent lanes. If the closest vehicle is in the adjacent lane, an overtaking maneuver is permitted if this lane is provided for lower velocities than the vehicle's own lane. This closest vehicle in the adjacent lane is then used as a target vehicle for the regulation of the distance if the vehicle is in an adjacent lane for higher velocities, in order to avoid this vehicle's performing an unacceptable overtaking maneuver in a lane for lower velocities.

One object of the invention is to improve driving safety in vehicles with automatic distance-maintaining means.

This and other objects and advantages are achieved by the method and apparatus according to the invention, in which the vehicle's own velocity and/or the setpoint distance from a vehicle which is traveling directly ahead in the same lane are determined as a function of the distance between a plurality of other vehicles traveling to the side. When the setpoint values for the distance and the vehicle's own velocity are determined, the distances between the vehicles in the adjacent lanes are taken into account, average distances being advantageously acquired from a multiplicity of individual measurements in order to ensure a constant and uniform adaptation of the distance and of the vehicle's own velocity.

The distances between vehicles traveling to the side are acquired, for example, by measuring the velocities of other vehicles which are traveling in succession, and measuring the time interval at which the vehicles which are traveling in succession travel past the vehicle in question.

The setpoint distance between the vehicle in question and the vehicle traveling directly ahead can be reduced to the distance between two other vehicles traveling to the side if the distance between at least two other vehicles traveling to the side is smaller than the currently set setpoint distance. For safety reasons a predefinable minimum value has to be expediently maintained, which minimum value can be set on a driver-specific basis but must not drop below a driver-independent lower limit. Likewise for safety reasons, it may be indicated that the setpoint distance is to be reduced only if the relative velocity between the vehicle and another vehicle in the vicinity is below a predefinable limiting value.

By setting distances in this way, the distance from the vehicle traveling ahead can be matched to the distances between the vehicles to the side, which are located in adjacent lanes. This is possible even if the distance between at least two other vehicles traveling to the side is greater than the currently set setpoint distance between the vehicle and the other vehicle traveling directly ahead, by increasing the setpoint distance to the distance between the other vehicles to the side, subject to a predefinable maximum value.

In the automatic distance-maintaining means, the vehicle velocity of another vehicle traveling to the side is advantageously taken into account by limiting the vehicle's own maximum permitted velocity to the velocity of the other vehicle to the side. Here, in particular the velocity of the closest other vehicle to the side is predefined as a maximum permitted velocity. Moreover, only other vehicles which have a specific, predefined lateral directional relationship with respect to the vehicle are expediently taken into account. That is, in countries where traffic drives on the right, only the vehicles which are located on the left-hand side of the vehicle are advantageously taken into account. (In contrast, only the other vehicles which are located on the right-hand side of the vehicle being taken into account in countries where traffic drives on the left.) As a result, allowance can be made for different national traffic regulations, in order to prevent the vehicle illegally overtaking vehicles traveling to the side in adjacent lanes.

The limitation of the vehicle's own velocity to the velocity of the other vehicle traveling to the side can be applied both in a situation in which the vehicle is carrying out a lane change from one lane to the next adjacent lane, and in a situation in which the vehicle is following the vehicle traveling ahead, without changing lanes using the distance-regulating system, and there are other vehicles traveling in the same direction in the adjacent lane. In the first situation—when the vehicle changes lanes—the lane change is first detected by reference to the degree of steering wheel lock or by reference to a corresponding change in the absolute position of the vehicle, for example, by means of a position-determining system such as, for example, GPS (Global Positioning System). The velocity of the other vehicle traveling directly ahead in the same lane is determined at the moment of the lane change and is stored as a maximum velocity. After the lane change has been completed, the vehicle's own velocity is limited to the stored maximum velocity so that the vehicle in the new lane cannot overtake the other vehicles in the previous lane. In this case, it is in turn possible to take into account the direction of the lane change by limiting the vehicle's own velocity only if the lane change is completed in a specific direction, but ruling out a limitation in the opposite direction, in order to permit the vehicle's own velocity to be automatically increased in order to carry out an overtaking maneuver which complies with the regulations.

However, it may also be advantageous to limit the vehicle's own velocity independently of the lane change when a vehicle remains in one lane. In this case, not only the distance from, and the velocity of, the other vehicle which is traveling straight on directly ahead, but also the velocity of another vehicle which is traveling ahead but to the side are taken into account, and the velocity of the other vehicle to the side is predefined as a maximum velocity.

It may be expedient to provide criteria for canceling the limitation to the maximum velocity, for example to provide a minimum time period which is to be predefined or determined, after the expiry of which the limitation is canceled.

According to a further advantageous refinement, there is provision for the distance from the other vehicle which is traveling directly ahead, and is located in the same lane, to be acquired and shortened automatically to a permitted minimum setpoint distance which is acceptable in terms of safety aspects, when the traffic situation is taken into account. In particular, it may be adapted to the absolute velocity of the vehicle. The intention here is to avoid the situation in which a distance which is set by the driver and which is to be maintained by means of the distance-regulating system and is greater than the permitted minimum setpoint distance leads to situations in which vehicles cut into the gap between the vehicle and the other vehicle traveling ahead, which can lead to hazardous situations under certain circumstances. Furthermore, this method provides the advantage that it is possible to travel in lines of traffic with the maximum possible vehicle density while complying with the relevant safety criteria. This method can, if appropriate, also be carried out independently of other vehicles traveling to the side.

The distance-regulating system according to the invention comprises a measuring device for sensing the vehicle state variables and characteristic variables of the vehicle in question as well as for sensing the position and vehicle velocity of at least one other vehicle; it also includes a regulating and control unit which receives as inputs the state and characteristic variables of the vehicle in question as well as the distance from, and vehicle velocity of, the other vehicle, and which generates actuation signals that are fed to vehicle actuator devices for setting the permitted distance from the other vehicle traveling ahead, in accordance with a stored regulating strategy. The measuring device expediently comprises means for measuring the velocity of a vehicle traveling to the side. The vehicle's own velocity and/or the setpoint distance from the other vehicle traveling directly ahead can be determined as a function of the vehicle velocity of another vehicle traveling to the side and/or of the distance between a plurality of other vehicles traveling to the side.

Other objects, advantages and novel features of the present invention will become apparent from the following detailed description of the invention when considered in conjunction with the accompanying drawings.

DETAILED DESCRIPTION OF THE DRAWINGS

Figure 1:
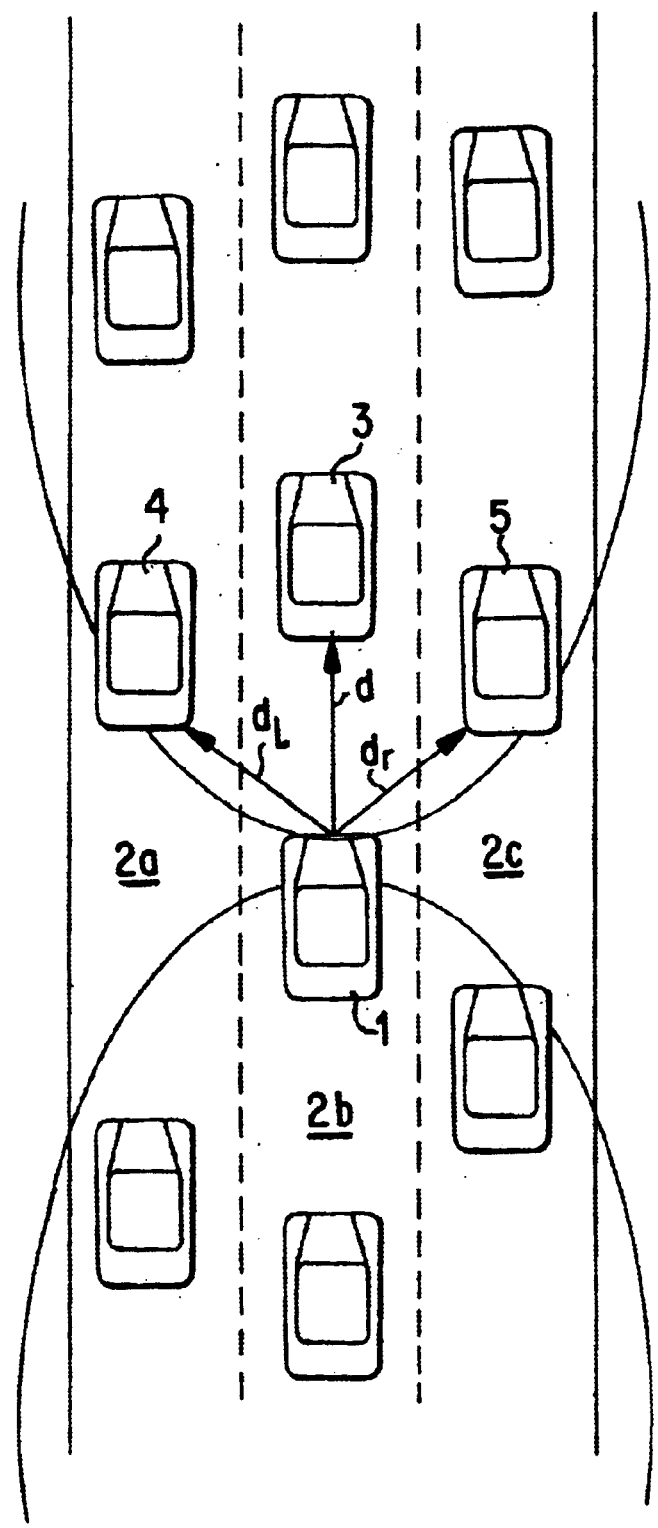
FIG. 1 shows a plan view of a vehicle with a distance-regulating system, the vehicle being located on a multi-lane road with a multiplicity of other vehicles traveling to the side and directly ahead.

FIG. 1 shows a road traffic situation on a multi-lane road with lanes 2a, 2b and 2c which lead in the direction of travel, each having multiple vehicles therein, moving in lines of traffic. A vehicle 1 which is moving in the central lane 2b of the road is equipped with a distance-regulating system that permits partially autonomous driving and in particular maintains, as a function of various vehicle state variables and parameters and external conditions, a defined distance from another vehicle 3 which is traveling directly ahead and is located in the same lane 2b. The distance between the vehicle 1 and the other vehicle 3 traveling directly ahead must not drop below a minimum distance which is determined in the distance-regulating system of the vehicle-regulating system of the vehicle 1, as a function of the velocity of the vehicle 1, and if appropriate, further conditions (for example environmental conditions).

The vehicle 1 is equipped with a distance-measuring device by means of which the distance d from the vehicle 3 traveling directly ahead can be measured. The distance-measuring device also makes it possible to sense vehicles 4 and 5 which are located in front of the vehicle 1 but are driving in the adjacent lanes 2a and 2c to the left and right of the central lane 2b of the vehicle 1. The distance from the vehicle 4 which is located in the left-hand lane 2a is designated by d1, and the distance from the vehicle 5 which is located in the right-hand lane 2c is designated by dr. The distance vector from the left-hand vehicle 4 encloses an angle with respect to the longitudinal center axis of the vehicle 1; the same applies to the distance vector which is directed to the vehicle 5 traveling in the right-hand lane 2c. By reference to the angle enclosed between the distance vectors and the vehicles traveling to the side in adjacent lanes, with respect to the longitudinal center axis of the vehicle 1 it is possible to determine unambiguously whether one of the other vehicles 3, 4 and 5 traveling ahead is in the same lane 2b as the vehicle 1 or is located to the side. In the case of a vehicle located to the side, the direction of the lateral offset can be determined.

It is expediently also possible to detect, by means of the distance-measuring device, vehicles which, viewed in the direction of travel, are located behind the vehicle 1. To the rear, too, it is possible to detect both vehicles which are traveling directly behind the vehicle in the same lane 2b, and vehicles which are traveling to the side in the lanes 2a and 2c. In particular in the case of overtaking or approaching vehicles, it may be expedient to limit the velocity of the vehicle 1 to its instantaneous value set at the time of the approaching or overtaking operation, and/or to provide the driver with a warning of the vehicles which are approaching or overtaking.

Figure 2:
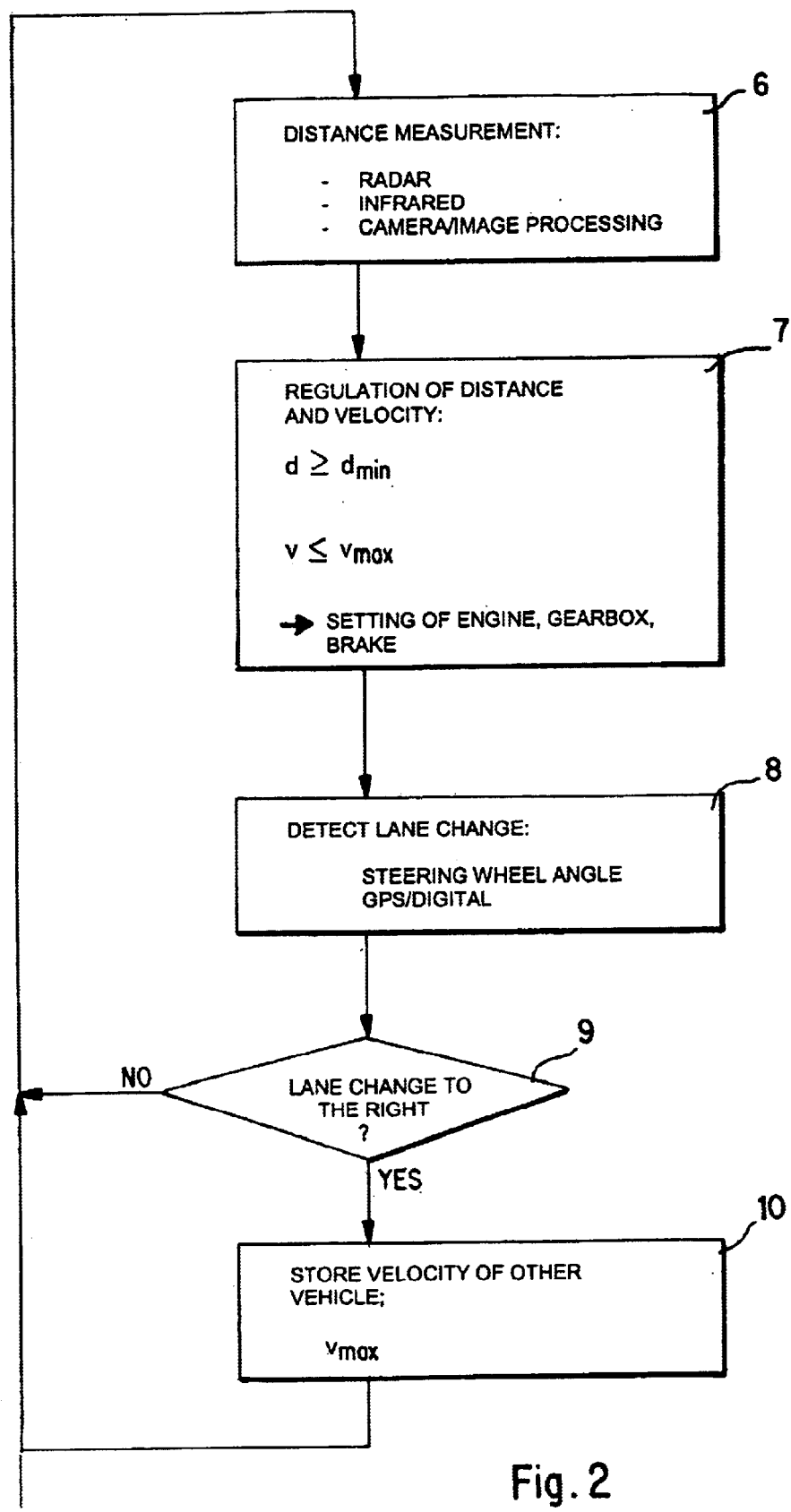
FIG. 2 shows a flowchart that illustrates the method for regulating distance in the case of a lane change to the right.

The flowchart in FIG. 2 shows an application of the method for regulating the distance between vehicles. In a first method step 6, the distance of the vehicle 1 from the other vehicle which is traveling directly ahead (located in the same lane) is first measured using the vehicle's own distance measuring device. This distance measurement can be carried out using a radar device, an infrared device or by means of optical systems which have a camera for optically sensing the other vehicle and an image-processing system for evaluating the image.

After the measurement of the distance, in a following method step 7 a distance-regulating operation and if appropriate also a velocity-regulating operation are carried out. For this purpose, a minimum distance $d_{min}$, which must not be undershot for safety reasons, is determined depending in particular on the absolute level of the vehicle's own velocity v. The distance is expediently adjusted to a setpoint distance which is not smaller than the minimum distance $d_{min}$, and may be predefined by the driver, for example. If the driver does not predefine any desired distance, the actual distance d can be adjusted to the minimum distance $d_{min}$.

As a further condition, it is possible to take into account the fact that the actual velocity v of the vehicle in question must not exceed a maximum velocity $v_{max}$. If the permitted maximum velocity $v_{max}$ is lower than the actual vehicle velocity of the vehicle traveling directly ahead, this condition for the setting of the vehicle velocity has priority over the regulation of the distance; in this case the actual velocity v of the vehicle in question is limited to the maximum velocity $v_{max}$, even if the desired distance from the vehicle traveling ahead cannot be maintained at this velocity v.

The maximum velocity $v_{max}$ may be acquired, for example, from telematics systems. However, it is also possible to predefine the maximum velocity on a vehicle-specific basis, for example in order to avoid exceeding the permitted maximum velocity of the currently fitted vehicle tires. The maximum velocity can also be influenced and predefined by the driver. Furthermore, it is possible to include environmental influences and other external influences, for example the weather, in the determination of the maximum velocity $v_{max}$.

If no maximum velocity $v_{max}$ is predefined, it is not necessary to fulfill a condition for the vehicle velocity during the regulation of the distance between vehicles and velocity so that the desired setpoint distance can be set directly. The setpoint distance and, if appropriate, the setpoint velocity of the vehicle are set by generating actuation signals which are fed to the engine, the gearbox and/or the vehicle brake system.

In the following method step 8, it is determined whether the vehicle is carrying out a lane change. This can be detected, on the one hand, with reference to the steering wheel angle by comparing the current steering wheel angle with a limiting value which is in particular dependent on the velocity, and a lane change is detected if this limiting value is exceeded. From the sign of the steering wheel angle it is also possible to detect whether a lane change is being carried out into the left-hand or the right-hand lane.

Alternatively, or additionally, a lane change can also be determined by means of a position-determining device, for example GPS, by means of which the current absolute position of the vehicle can be detected, and a digital map which contains a road network to a sufficient degree of precision.

In the following method step 9, the direction of the lane change is interrogated. As a result, different national regulations can be allowed for, in order to ensure that an overtaking maneuver which is contrary to regulations, for example overtaking in the right-hand lane, is not carried out by the vehicle after a lane change when the distance-regulating system is still activated or is to be activated again.

In method step 9, it is interrogated whether a lane change into the right-hand lane has been carried out. If not, the system returns to the start of the method at the first method step 6 in accordance with the No-branch. In this case, no additional peripheral conditions—resulting from the lane change—are predefined for the vehicle's own velocity for the distance-regulating and velocity-regulating operation.

However, if a lane change to the right has been detected, the system continues to the following method step 10, in accordance with the Yes-branch of the method step 9, and in accordance with this method step 10 the velocity of the other vehicle which is traveling directly ahead at the moment of the lane change is acquired and stored as a maximum velocity $v_{max}$. After the method step 10, the system returns again to the first method step 6 and the entire method sequence is run through again, the maximum velocity $v_{max}$ being taken into account as a supplementary peripheral condition in the method step 7 in which the distance-regulating and velocity-regulating operation is carried out.

By taking into account the vehicle velocity of the other vehicle as a maximum velocity $v_{max}$, the intention is to ensure that, when there is a lane change into the right-hand lane, the vehicle does not carry out, when the distance-regulating system is activated, an overtaking maneuver in the right-hand lane which is contrary to regulations. As the vehicle's own velocity cannot exceed the maximum velocity $v_{max}$, an overtaking maneuver in the right-hand lane is precluded.

It may, if appropriate, be expedient to maintain the limitation to the maximum velocity $v_{max}$ only for a specific time period, which may be either permanently predefined or determined in a variable fashion. It is, in particular, advantageous to provide an abort condition for the predefinition of the maximum velocity, which expediently consists in the fact that, in addition to the velocity of the vehicle traveling directly ahead, the velocity of the vehicle traveling ahead to the side is measured by means of the measuring device in the vehicle, and the maximum velocity is continuously adapted in accordance with the velocity of the other vehicle traveling to the side.

Figure 3:
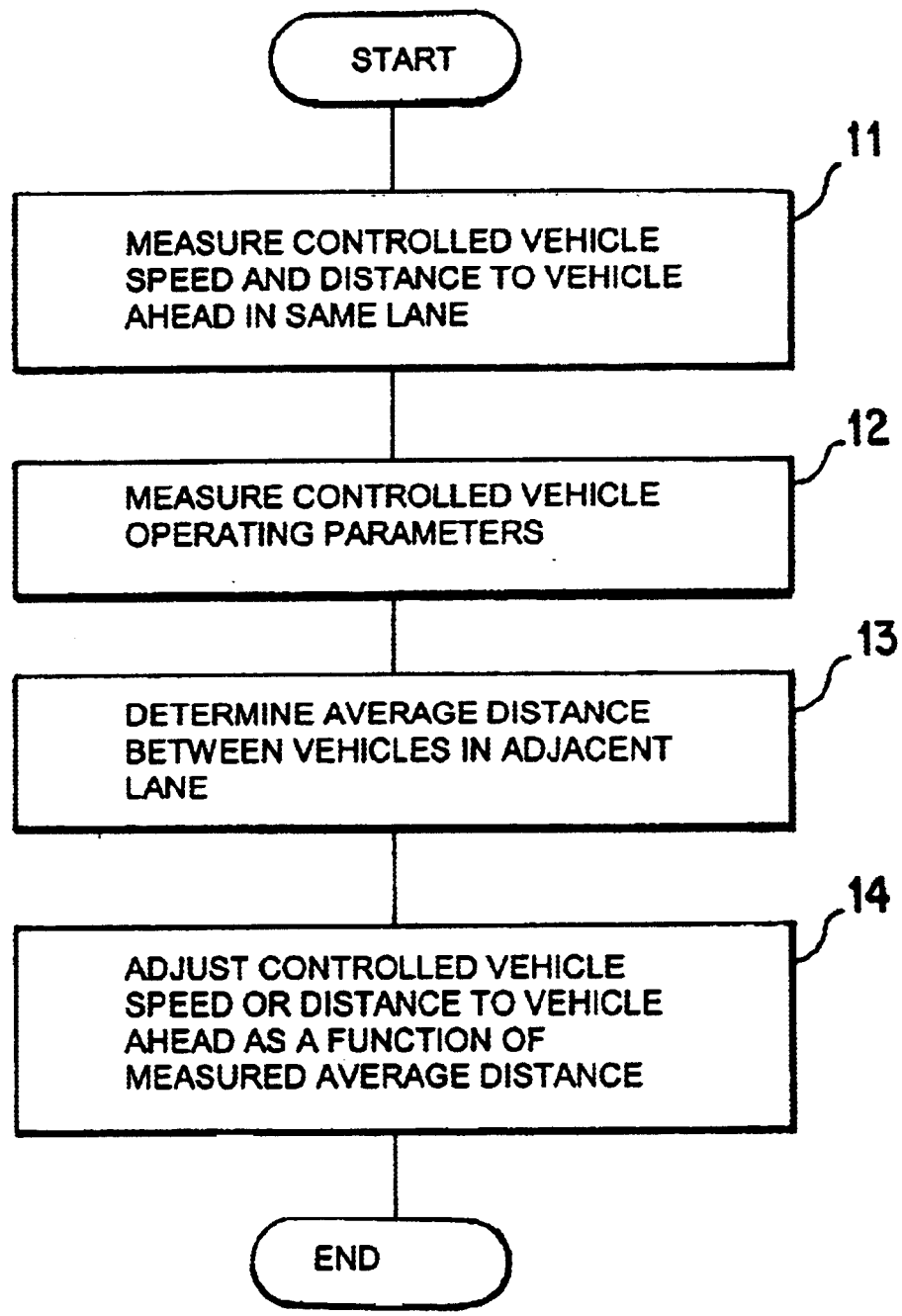
FIG. 3 is a flowchart that illustrates the method according to another embodiment of the invention.

FIG. 3 is a flowchart which illustrates another embodiment of the method according to the present invention. In this embodiment, the vehicle's own velocity and/or the setpoint distance from a vehicle which is traveling directly ahead in the same lane are determined as a function of the distance between a plurality of other vehicles traveling in an adjacent lane. As shown in FIG. 3, in step 11 the speed of the controlled vehicle and the distance to the vehicle ahead in the same lane are determined. A plurality of vehicle operating parameters are thereafter measured in step 12, and in step 13, the average distance between vehicles in an adjacent lane is determined. Finally, either the controlled vehicle speed, or the distance to the vehicle ahead is adjusted in step 14, as a function of the measured average distance. In particular, the setpoint distance between the controlled vehicle and the vehicle traveling ahead can be reduced to the distance between two other vehicles traveling to the side, if the latter is smaller than the currently setpoint distance.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed:

1. A method for regulating the distance between a controlled vehicle and a first vehicle traveling directly ahead of the controlled vehicle in proximity thereto, said method comprising:

sensing vehicle state and characteristic variables of the controlled vehicle, as well as its distance from, and the velocity of, at least the first vehicle and controlling a velocity of the controlled vehicle and its distance from the first vehicle to permitted setpoint values as a function of sensed values;

wherein, at least one of the velocity of the controlled vehicle and the setpoint distance value from the first vehicle determined as a function of a distance between at least a second vehicle and a third vehicle which are traveling to the side of the controlled vehicle.

2. The method according to claim 1, wherein:

position of the controlled vehicle is determined in absolute coordinates; and relative position of other vehicles are measured with respect to the vehicle.

3. The method according to claim 1, wherein:

distance from the vehicle traveling directly ahead is determined; and if the actual distance is greater than a minimum distance to be maintained between the controlled vehicle and the vehicle traveling directly ahead, the distance is shortened automatically to minimum distance.

4. The method according to claim 1, wherein if the distance between the second and third vehicles is greater than a current setpoint distance between the controlled vehicle and the first, the setpoint distance is increased to the distance between the second and third vehicles.

5. The method according to claim 4, wherein the increase of the setpoint distance is limited to a predefinable maximum value.

6. The method according to claim 1, wherein in the case of a lane change, the velocity of the controlled vehicle is limited to a predefined value.

7. The method according to claim 6, wherein in the case of a lane change, the velocity of the controlled vehicle is limited to a velocity value at which the controlled vehicle is driven directly before the lane change.

8. The method according to claim 1, wherein if the distance between the second and third vehicles is smaller than a currently set setpoint distance between the controlled vehicle and the first vehicle the setpoint distance is reduced to the distance between the second and third vehicles.

9. The method according to claim 8, wherein the setpoint distance is reduced only to a predefinable minimum value.

10. The method according to claim 8, wherein the setpoint distance is changed only if relative velocity between the controlled vehicle and at least one other vehicle in proximity to the controlled vehicle is below a predefinable limiting value.

11. The method according to claim 1, wherein the velocity of the controlled a vehicle is limited to the velocity of one of said vehicles traveling to its side.

12. The method according to claim 11, wherein the velocity of one of said vehicles which are traveling to the side of the controlled vehicle and ahead of it, is determined and is predefined as a maximum velocity ($v_{max}$) for the vehicle's own velocity.

13. The method according to claim 11, wherein:

a lane change of the controlled vehicle is detected;

at a time when the lane change occurs, the velocity of the vehicle traveling ahead in the same lane is determined and is stored as a maximum velocity ($v_{max}$); and after the lane change has been completed, the controlled vehicle's velocity is limited to the maximum velocity ($v_{max}$).

14. The method according to claim 13, wherein the controlled vehicle's velocity is limited only when there is a lane change in a single, specified direction.

15. The method according to claim 13, wherein limitation of the controlled vehicle's velocity to the maximum velocity ($v_{max}$) is canceled after expiration of a minimum time period which is predefined or is to be determined.

16. A distance-regulating system for a controlled vehicle, comprising:

a measuring device for sensing vehicle state and characteristic variables of the controlled vehicle, and for sensing position and velocity of at least one other vehicle in proximity to the controlled vehicle; and a regulating and control unit for generating and providing to actuator devices in the vehicle, actuating signals for setting one of a permitted distance from a first vehicle traveling directly ahead of the controlled vehicle and a permitted velocity of the controlled vehicle, as a function of the sensed vehicle state variables and distance from and velocity of the first vehicle, in accordance with a stored regulating strategy;

wherein one of the controlled vehicle's velocity and the setpoint distance from the first vehicle is determined as a function of distance between at least second and third vehicles traveling in a lane adjacent the controlled vehicle.

17. The distance-regulating system according to claim 16, wherein the measuring device comprises a position-determining device for determining an absolute position of the vehicle.

18. The distance-regulating system according to claim 17, wherein the measuring device comprises one of a radar measuring device, an infrared measuring device and a video camera with an image-processing system for measuring at least one of relative velocity and relative distance with respect to other vehicles.

* * * * *